W. D. QUIGLEY.
BEARING FOR JOURNALS, SHAFTS, AND HUBS.
APPLICATION FILED NOV. 2, 1916.

1,242,239.

Patented Oct. 9, 1917.

Witness.
H. B. Davis.

Inventor,
William D. Quigley
by Bryn Harriman
Atty.

UNITED STATES PATENT OFFICE.

WILLIAM DAVID QUIGLEY, OF EAST BOSTON, MASSACHUSETTS.

BEARING FOR JOURNALS, SHAFTS, AND HUBS.

1,242,239.  Specification of Letters Patent.  Patented Oct. 9, 1917.

Application filed November 2, 1916. Serial No. 129,224.

*To all whom it may concern:*

Be it known that I, WILLIAM D. QUIGLEY, a citizen of the United States, residing at East Boston, in the county of Suffolk and State of Massachusetts, have invented an Improvement in Bearings for Journals, Shafts, and Hubs, of which the following is a specification.

This invention relates to bearings or bushings for journals, shafts and hubs, and has for its object the provision of an improved form of oiling means associated with the bearing, which is simple and efficient, and provides a continuous supply of oil entirely around and throughout the length of its bore.

The invention consists in providing an endless channel which is extended entirely around and throughout the length of the bore, and in open communication therewith throughout its length, whereby a continuous circulation of oil may be maintained in either direction according to the direction of rotation of the rotating element, said channel having arranged in open communication with it, at any desired point, a gravity feed oil-supply from a suitable receptacle or other source.

Referring to Figs. 1 to 5, wherein a split bearing is shown, 10 and 12 represent the two complemental parts of the bearing having an interior bore. Each part has formed in its bore a coöperative part of the channel, so that when the two parts are complementally arranged a continuous or endless channel is provided. In the bore of each of said parts there is formed a short transverse groove 15, near one end and a similar transverse groove 16, near the other end, said transverse grooves being disposed at opposite sides of the bore, and a spiral groove 17 connecting the inner ends of said grooves. As each element is provided with corresponding grooves, it will be observed that when the two parts are complementally arranged the transverse grooves of each part will be disposed in continuation and thus provide a continuous or endless channel which extends around the wall of the bore and substantially throughout its length. For simplicity of construction the transverse grooves are extended inward, respectively, from the opposite edges or sides of the split members.

An oil cup, or other receptacle or source of oil-supply 20, is arranged in open communication with said channel at any desired point, as for instance, it may be screwed into the wall of the bearing, at the top, and its screw-threaded nozzle arranged to open into the channel, thus to provide a gravity-feed oil supply. When this receptacle is filled with oil, and the rotating element caused to rotate in the bearing, or the bearing to rotate, the oil which is contained in or fills the channel is caused to circulate therein in a direction according to the direction of rotation of the rotating element.

Figure 1:
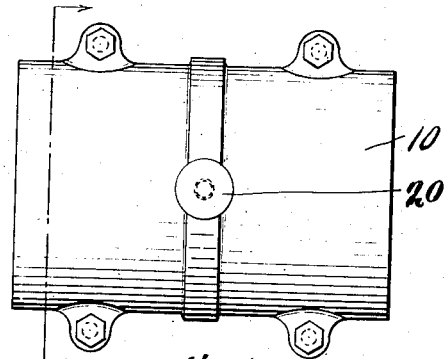
Figure 1 is a plan view of a bearing embodying this invention.
Figure 3:
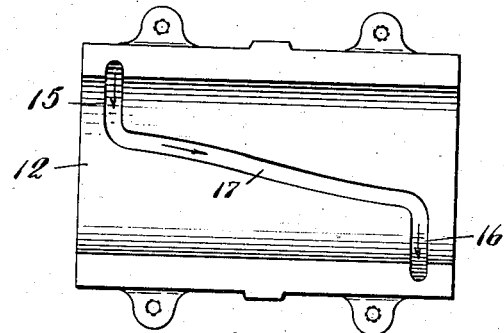
Figs. 3 and 4 are interior views of the two complemental parts of a split bearing embodying my invention.
Figure 4:
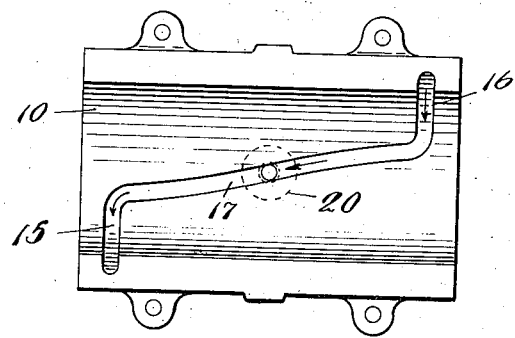
Figure 2:
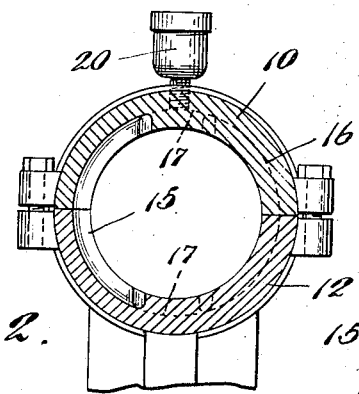
Fig. 2 is a transverse vertical section of the same.
Figure 5:
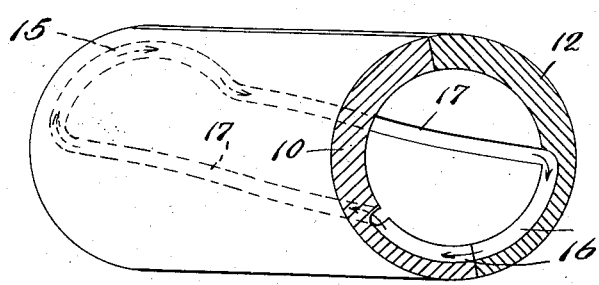
Fig. 5 is a conventional view illustrating the continuous or endless channel arranged in the wall of the bore of the bearing.
Figure 6:
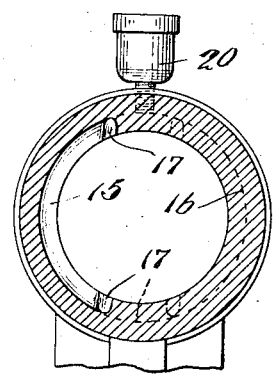
Fig. 6 is a transverse sectional view of a bearing made essentially of a single piece.

The channel provides for a free and uninterrupted circulation of oil in either direction which is of considerable importance, as the rotating element may rotate in either direction without reversing the position of the bearing in order to cause circulation of the oil. This result is one of the many advantages of the endless or continuous channel formed substantially in the manner shown. Furthermore, in the form of channel shown, it will be observed that at each end of the bore there is a transverse groove which extends part way around the bore, said transverse groove being oppositely disposed, and that two connecting grooves are extended lengthwise of the bore, so that the element arranged in the bearing will be effectively lubricated. In lieu of forming the bearing of two complemental parts, it may be formed essentially of a single piece, as represented in Fig. 6.

I claim:—

1. A bearing having a cylindrical bore, and a single continuous channel formed in the wall of the bore which is extended around the same, and substantially throughout its length, whereby oil contained therein is caused to circulate in either direction according to the direction of rotation of the rotating element and to lubricate the bearing from end to end, and means in open communication with said channel for providing a continuous supply of oil.

2. A bearing having a cylindrical bore, and a single continuous channel formed in the wall of the bore, and opening thereinto throughout its length, which includes transverse portions at the ends, and uninterrupted spiral connecting portions therebetween, and means, in open communication with said channel, for providing a continuous supply of oil.

3. A bearing having a cylindrical bore, and a groove extended transversely around a portion of the bore at one end, and a similar groove extended transversely around an opposite portion of said bore at the other end, and two grooves in the bore extended spirally and respectively connecting the corresponding ends of the transverse grooves, all said grooves being in open communication with the interior of the bore from end to end, and forming a continuous channel for the circulation of oil in either direction.

4. A bearing having a cylindrical bore, and a groove extended transversely around a portion of the bore at one end, and a similar groove extended transversely around an opposite portion of said bore at the other end, and two grooves in the wall of the bore extended spirally and respectively connecting the corresponding ends of the transverse grooves, all said grooves being in open communication with the interior of the bore from end to end, and forming a continuous channel for the circulation of oil, and an oil receptacle arranged in open communication with said channel to afford a gravity-feed oil supply.

5. A bearing having a cylindrical bore, and a groove extended transversely around a portion of the bore at one end, and a similar groove extended transversely around an opposite portion of said bore at the other end, and two grooves in the bore extended spirally and respectively connecting the corresponding ends of the transverse grooves, all said grooves being in open communication with the interior of the bore from end to end, and forming a continuous channel for the circulation of oil, and means in open communication with the continuous channel for providing a continuous supply of oil.

6. A bearing composed of two similar complemental parts having a cylindrical bore, each part having a groove extending transversely inward from one edge along a portion of the bore at one end, and a similar groove extended transversely inward from its other edge along a portion of the bore at the other end, and a groove extended spirally and connecting the corresponding ends of said transverse grooves, all said grooves being in open communication with the interior of the bore from end to end, and forming a continuous channel for the circulation of oil when the two bores are complementally arranged.

In testimony whereof, I have signed my name to this specification, in the presence of two subscribing witnesses.

WILLIAM DAVID QUIGLEY.

Witnesses:
B. J. NOYES,
H. B. DAVIS.